Patented Sept. 5, 1950

2,521,528

UNITED STATES PATENT OFFICE 2,521,528

ELASTIC HYDROCARBON - SUBSTITUTED POLYSILOXANES AND TERTIARY BUTYL PERBENZOATE AS CATALYST

James Marsden, Schenectady, N. Y., assignor to General Electric Company, a corporation of New York No Drawing. Application July 24, 1947,
Serial No. 763,445

17 Claims. (Cl. 260—37)

This invention is concerned with heat-convertible, elastic compositions of matter and methods of preparing the same. More particularly, the invention relates to a heat-convertible composition of matter comprising (1) a solid, elastic, heat-curable, polymerized hydrocarbon-substituted polysiloxane containing an average of from about 1.95 to 2.0 hydrocarbon groups per silicon atom, the said hydrocarbon groups being attached to the silicon atoms through C—Si linkages, and (2) tertiary butyl perbenzoate present, by weight, in an amount equal to from about 0.25 to 6 per cent of the weight of (1).

Elastomeric compositions of matter comprising heat-converted elastic hydrocarbon-substituted polysiloxanes (commonly known as "silicone rubbers") have found extensive use in applications requiring resistance to elevated temperatures for extended periods of time. Such compositions of matter and methods of preparing the same are more specifically disclosed and claimed in, for example, Wright et al. application, Serial No. 526,472, now Patent Number 2,448,565, and Agens application Serial No. 526,473, now Patent Number 2,448,756, both filed March 14, 1944; Elliott and Krieble application Serial No. 598,914, now Patent Number 2,457,688, and Marsden application, Serial No. 598,912, now Patent Number 2,445,794, the latter two applications being filed June 11, 1945; Sprung application, Serial No. 722,457, now Patent Number 2,484,595, and Sprung et al. application, Serial No. 722,459, now Patent Number 2,448,556, both filed January 16, 1947. All the foregoing applications are assigned to the same assignee as the present invention.

In the aforementioned Wright et al. application, there is disclosed and claimed the use of benzoyl peroxide as a catalyst for converting a solid, elastic, curable (or vulcanizable) hydrocarbon-substituted polysiloxane, more particularly, a methyl-substituted polysiloxane containing an average of from about 1.98 to 2.0 methyl groups per silicon atom, to a cured elastomeric product.

Heretofore, it was believed that benzoyl peroxide was one of the very few catalysts capable of converting solid, elastic, curable hydrocarbon-substituted polysiloxanes containing an average of from 1.95 to 2.0 hydrocarbon groups per silicon atom (for brevity, the aforementioned polysiloxane will hereinafter be referred to as the "elastic product") to cured elastomeric products having greater tensile strengths and better tear-resistances than those possessed by the compositions prior to incorporation of the benzoyl peroxide and subsequent heat treatment.

Thus, attempts to use other catalysts, for example, tertiary butyl hydroperoxide, dibenzal diperoxide, urea peroxide, lead peroxide, sodium perborate, sodium persulfate, and 1-hydroxycyclohexyl hydroperoxide-1, etc., with the elastic product in the same manner as benzoyl peroxide, either gave compositions of matter inferior to those catalyzed with benzoyl peroxide, or else failed to exercise a cure-accelerating or vulcanizing effect on the synthetic elastic product under the influence of heat.

In addition, one of the difficulties encountered using benzoyl peroxide was the inability to obtain suitably cured elastomeric compositions where any form of carbon was employed as a filler. Whenever carbon, e. g., carbon black, was employed as a filler, it exercised a strong inhibiting effect on the curing properties of benzoyl peroxide, resulting in inferior products.

I have now discovered that another cure accelerator or vulcanizing agent, in addition to benzoyl peroxide, can be employed to give heat-cured compositions of matter having at least the same properties as those obtained by using benzoyl peroxide as the cure accelerator for the synthetic elastic product. I have also found that tertiary butyl perbenzoate will effect vulcanization or curing of the elastic product to a heat-converted synthetic elastomer under the influence of heat even when the filler for the elastic product is one of the forms of carbon. The fact that tertiary butyl perbenzoate had the foregoing properties was entirely unexpected and could in no way have been predicted. By means of my invention, I can advantageously use carbon black as a filler thereby permitting the manufacture of cured elastic products (synthetic elastomers) possessing better tear-resistance than other silicone elastomers containing fillers other than carbon black.

One of the objects of the present invention is to provide a cured, solid, elastic hydrocarbon-substituted polysiloxane containing an average of from about 1.95 to 2 hydrocarbon groups per silicon atom (for brevity the aforementioned cured or heat-converted product will hereinafter be referred to as the "synthetic elastomer") using a catalyst other than benzoyl peroxide. Another object of this invention is to provide a method whereby suitable synthetic elastomers may be obtained containing finely-divided carbon as a filler. Other objects of this invention will become apparent from the detailed description which follows:

Briefly stated, the heat-curable, solid, elastic-hydrocarbon - substituted polysiloxanes with which this invention is concerned may be described as polysiloxanes consisting of hydrocarbon radicals, and silicon and oxygen atoms having the recurring structural units

where R and R' are the same or different monovalent hydrocarbon radicals, for example, aliphatic radicals, for instance, alkyl radicals, e. g., methyl, ethyl, propyl, isopropyl, etc.; vinyl radicals, etc; aryl radicals, for instance, phenyl, naphthyl, etc.; aralkyl radicals, for instance, benzyl, phenylethyl, etc.; alkaryl, for instance, tolyl, etc.; acyclic radicals, for instance, cyclopentyl, cyclohexyl, etc. Preferably R and R' are lower alkyl radicals, more particularly, the methyl radical, and are the same.

A more complete description of the nature of the synthetic elastic products with which my invention is concerned and which may be converted to the vulcanized synthetic elastomers may be found in the various applications cited previously. These aforementioned applications also contain various methods by which the uncured, solid, elastic product may be obtained from the various liquid, non-resinous hydrocarbon-substituted polysiloxanes.

In the preferred embodiments of my invention, the solid, elastic, curable (i. e., heat-convertible) polymerized hydrocarbon-substituted polysiloxane is one in which the average ratio of hydrocarbon groups to silicon atoms ranges from about 1.95 to 2.0 hydrocarbon groups per silicon atom, and where at least 90 per cent of the silicon atoms have two hydrocarbon radicals attached thereto, the remaining 10 per cent or less of the silicon atoms having from 1 to 3 hydrocarbon radicals attached to the silicon atoms so that the overall proportion of hydrocarbon radicals to silicon atoms in the entire hydrocarbon-substituted polysiloxane is still within the range of 1.95 to 2.0. Preferably the solid, elastic, curable hydrocarbon-substituted polysiloxane (e. g., methylpolysiloxane) contains an average of from 1.98 to 2 hydrocarbon (e. g., methyl) radicals per silicon atom, the said elastic hydrocarbon-substituted polysiloxane being obtained by condensing a liquid polymeric dihydrocarbon-substituted siloxane (e. g., polymeric dimethylsiloxane) containing up to 2 mol per cent copolymerized monohydrocarbon-substituted siloxane (e. g., monomethylsiloxane) as disclosed more fully in the previously mentioned applications of Agens, Wright et al., etc.

In order to prepare a synthetic elastomer from the elastic product, the latter may be worked on ordinary mixing or differential rubber rolls until it attains the desired consistency. The tertiary butyl perbenzoate, and if desired, the filler, may be added during this operation. After being formed into the desired shape and molded under the influence of heat and pressure, the synthetic elastomer may be further cured or heat-treated in an oven until the desired degree of cure is obtained.

The amount of tertiary butyl perbenzoate added to the elastic product depends to some extent on the desired characteristics of the cured product. Generally, the tertiary butyl perbenzoate is used in amounts ranging from about 0.25 to 6, more advantageously from about 1 to 4, per cent, by weight, based on the weight of the solid, elastic, curable hydrocarbon-substituted polysiloxone. Although larger quantities may be employed, the amount of tertiary butyl perbenzoate employed as a curing agent ordinarily should not exceed about 6 per cent, particularly where the finely cured product will be continuously subjected to elevated temperatures.

Among the fillers which may be employed in this invention may be mentioned inorganic fillers, for example, lithopone, ferric oxide, titanium dioxide, talc, zinc oxide, etc. Various forms of carbon such as finely divided and colloidal carbons may be advantageously employed as a filler. These include various carbon blacks, for example, channel black, gas black, furnace carbons, various thermal carbons, acetylene black, etc. Where increased tear-resistance is desired, I prefer to use channel carbon black as the filler. The aforementioned fillers may be incorporated in the elastic product in amounts ranging from about 10 to 90 per cent, preferably from about 25 to 75 per cent, of the total weight of the filler and elastic product.

In order that those skilled in the art may better understand how the instant invention may be practiced, the following examples are given by way of illustration rather than by way of limitation. All parts are by weight.

EXAMPLE 1

A solid, elastic, rubbery, polymerized methyl-substituted polysiloxane was prepared by hydrolyzing dimethyldichlorosilane containing about 0.15 mol per cent methyltrichlorosilane, and thereafter condensing the liquid, oily non-resinous, methyl polysiloxane with ferric chloride hexahydrate in the same manner as disclosed in the aforementioned Agens application (supra).

EXAMPLE 2

About 100 parts of the elastic product obtained in Example 1 was milled on differential rubber rolls for about ½ hour with 1 part PbO, 50 parts channel carbon black, and 3.2 parts tertiary butyl perbenzoate until a homogeneous sheet was obtained. The rolled sheet was molded between heated platens for about 20 minutes at 150° C., and thereafter aged in an air-circulating oven at 200° C. The following table shows the result of this treatment:

Table 1

| Aging Conditions | Tensile, p. s. i. | Per Cent Elongation | Remarks |
|---|---|---|---|
| As pressed | 180 | 500 | Flexible, soft sheet. |
| 12 hours at 200° C. | 555 | 300 | Flexible, elastic tougher sheet. |
| 24 hours at 200° C. | 585 | 300 | Elastic, flexible, tough sheet. |

When an equivalent amount of benzoyl peroxide was incorporated in the elastic product in place of the tertiary butyl perbenzoate used above during the milling process on the differential rolls, and the milled product molded using the same conditions as above, there was obtained a product which showed no vulcanization effect, and whose properties were approximately the same as those of the product prior to heating in the mold. This evidence indicates that the carbon black had an inhibiting effect on the benzoyl peroxide with regard to its vulcanizing effect.

EXAMPLE 3

To 100 parts of the elastic product obtained in

Example 1 were added, on differential rubber rolls, 1 part lead oxide, 200 parts titanium dioxide, and 3.2 parts tertiary butyl perbenzoate. After rolling the sheet on the differential rolls in the same manner as was done in Example 2, the sheet was pressed between platens for 20 minutes at 150° C. Thereafter, the cured sheet was heat-aged in a 200° C. oven for varying lengths of time. The following table shows the results of this heat-aging:

Table 2

| Aging Conditions | Tensile, p. s. i. | Per Cent Elongation | Remarks |
|---|---|---|---|
| As pressed | 495 | 220 | Tough, flexible, elastic product. |
| 4 hours at 200° C | 620 | 170 | Tough, flexible, highly elastic product. |
| 24 hours at 200° C | 705 | 165 | Tough, flexible, highly elastic product. |

When an equivalent amount of benzoyl peroxide was employed in place of the tertiary butyl perbenzoate above and the filled, elastic product molded and heat-aged as was done above, there was obtained a synthetic silicone elastomer whose properties were not significantly different from the properties of the synthetic elastomer obtained using tertiary butyl perbenzoate as the cure accelerator.

The synthetic elastomers, i. e., the synthetic silicone elastomers, prepared and vulcanized in accordance with my invention, are capable of withstanding elevated temperatures (150° to 200° C.) for extended periods of time, and retain their desirable rubbery properties at temperatures as low as −50° to −60° C. Such a range of properties makes them highly useful as insulation materials for electrical conductors, gasket material, shock absorbers, and for other applications for which known natural or synthetic rubbers have heretofore been employed.

What I claim as new and desire to secure by Letters Patent of the United States, is:

1. A heat-convertible composition of matter comprising (1) a solid, elastic, curable, polymerized hydrocarbon-substituted polysiloxane wherein the hydrocarbon radical is selected from the class consisting of alkyl, aryl, aralkyl, and alkaryl radicals, and containing an average of from 1.95 to 2.0 hydrocarbon groups per silicon atom and (2) tertiary butyl perbenzoate present, by weight, in an amount equal to from about 0.25 to 6 per cent of the weight of (1).

2. A heat-convertible composition of matter comprising (1) a solid, elastic, curable, polymerized methylpolysiloxane containing an average of from 1.98 to 2.0 methyl groups per silicon atom, the said methylpolysiloxane being the product of condensation of a liquid polymeric dimethylsiloxane containing up to 2 mol per cent copolymerized monomethylsiloxane, and (2) tertiary butyl perbenzoate present, by weight, in an amount equal to from about 0.25 to 6 per cent of the weight of (1).

3. A product comprising the heat-cured composition of claim 2.

4. A heat-convertible composition of matter comprising (1) a solid, elastic, curable, hydrocarbon-substituted polysiloxane consisting of silicon and oxygen atoms, and methyl and phenyl radicals, and containing an average of from 1.95 to 2.0 methyl and phenyl groups per silicon atom and (2) tertiary butyl perbenzoate present, by weight, in an amount equal to 0.25 to 6 per cent of the weight of (1).

5. A product comprising the heat-cured composition of claim 4.

6. A heat-convertible composition of matter comprising (1) a solid, elastic, curable, polymerized methylpolysiloxane containing from 1.98 to 2.0 methyl groups per silicon atom, the said methylpolysiloxane having been obtained by condensing a liquid polymeric dimethylsiloxane containing up to 2 mol per cent copolymerized monomethylsiloxane, (2) a filler, and (3) from 0.25 to 6 per cent, by weight, tertiary butyl perbenzoate based on the weight of (1).

7. A heat-convertible composition of matter as in claim 6 wherein the filler comprises finely divided carbon.

8. A cured elastomeric article of manufacture comprising the product of molding under heat of a composition of matter comprising (1) a solid, elastic, curable, polymerized methylpolysiloxane containing an average of from 1.98 to 2.0 methyl groups per silicon atom, the said methylpolysiloxane having been obtained by condensing a liquid polymeric dimethylsiloxane containing up to 2 mol per cent copolymerized monomethylsiloxane, (2) a filler comprising carbon black, and (3) from about 1 to 4 per cent, by weight, of tertiary butyl perbenzoate based on the weight of (1).

9. The method which comprises (1) incorporating tertiary butyl perbenzoate into a solid, elastic, curable, polymerized hydrocarbon-substituted polysiloxane wherein the hydrocarbon radical is selected from the class consisting of alkyl, aryl, aralkyl, and alkaryl radicals, and containing an average of from 1.95 to 2.0 hydrocarbon groups per silicon atom, in an amount equal to from 0.25 to 6 per cent, by weight, of the said polysiloxane, and (2) heating the resulting product thereby to accelerate the curing of the said polysiloxane to an elastomeric product.

10. The method which comprises (1) incorporating tertiary butyl perbenzoate into a solid, elastic, curable, polymerized methyl-substituted polysiloxane containing an average of from 1.98 to 2.0 methyl groups per silicon atom, the said polysiloxane having been obtained by condensing a liquid polymeric dimethylsiloxane containing up to 2 mol per cent copolymerized monomethylsiloxane, the perbenzoate being present in an amount equal to from 0.25 to 6 per cent, by weight, of the said polysiloxane, and (2) heating the resulting product thereby to accelerate the curing of the said polysiloxane to an elastomeric product.

11. The method which comprises (1) incorporating tertiary butyl perbenzoate into a composition of matter comprising (a) a solid, elastic, curable, polymerized methylpolysiloxane containing an average of from 1.98 to 2.0 methyl groups per silicon atom, the said polysiloxane having been obtained by condensing a liquid polymeric dimethylsiloxane containing up to 2 mol per cent copolymerized monomethylsiloxane, and (b) a filler, the said tertiary butyl perbenzoate being present in an amount equal to from 0.25 to 6 per cent, by weight, of the said polysiloxane, and (2) heating the resulting product thereby to accelerate the curing of the said composition of matter to an elastomeric product.

12. The method as in claim 11 wherein the filler is finely divided carbon black.

13. A heat-convertible composition of matter comprising (1) a solid, elastic, curable, polymerized hydrocarbon substituted polysiloxane wherein the hydrocarbon radicals are alkyl radicals, and containing an average of 1.95 to 2.0 hydrocarbon groups per silicon atom and (2) tertiary butyl perbenzoate present, by weight, in an amount equal to from about 0.25 to 6 per cent, by weight, of (1).

14. A heat-convertible composition of matter comprising (1) a solid, elastic, curable, polymerized methylpolysiloxane consisting of silicon and oxygen atoms, and methyl radicals, and containing an average of from 1.98 to 2.0 methyl groups per silicon atom, and (2) tertiary butyl perbenzoate present, by weight, in an amount equal to from about 0.25 to 6 per cent of the weight of (1).

15. A heat-convertible composition of matter comprising (1) a solid, elastic, curable, polymerized methylpolysiloxane consisting of silicon and oxygen atoms and methyl radicals, and containing an average of from 1.98 to 2.0 methyl groups per silicon atom, (2) tertiary butyl perbenzoate present, by weight, in an amount equal to from about 0.25 to 6 per cent of the weight of (1) and (3) a filler.

16. A heat-convertible composition of matter comprising (1) a solid, elastic, curable, polymerizable hydrocarbon-substituted polysiloxane wherein the hydrocarbon radicals are alkyl radicals, and containing an average of from 1.95 to 2.0 hydrocarbon groups per silicon atom, (2) a filler comprising carbon black, and (3) tertiary butyl perbenzoate present, by weight, in an amount equal to from about 0.25 to 6 per cent, by weight, of (1).

17. A heat-convertible composition of matter comprising (1) a solid, elastic, curable, polymerizable methylpolysiloxane consisting of silicon and oxygen atoms and methyl radicals, and containing an average of from 1.98 to 2.0 methyl groups per silicon atom, (2) a filler comprising carbon black, and (3) tertiary butyl perbenzoate present, by weight, in an amount equal to from about 0.25 to 6 per cent, by weight, of (1).

JAMES MARSDEN.

REFERENCES CITED

The following references are of record in the file of this patent:

UNITED STATES PATENTS

| Number | Name | Date |
|---|---|---|
| 2,392,713 | Wright et al. | Jan. 8, 1946 |
| 2,420,911 | Roedel | May 20, 1947 |